Patented Feb. 25, 1936

2,031,721

UNITED STATES PATENT OFFICE 2,031,721

METHOD OF MANUFACTURING HIGHLY EMISSIVE CATHODES

Siegmund Loewe, Berlin-Steglitz, Germany

No Drawing. Original application July 16, 1931, Serial No. 551,296. Divided and this application June 16, 1933, Serial No. 676,040. In Germany July 17, 1930

3 Claims. (Cl. 250—27.5)

This application is a division of my application 551,296.

The present invention relates to a method of producing an atmosphere of an earth alkaline metal in discharge valves, such as are used for transmitting, amplifying and rectifying purposes.

As well known, highly emissive cathodes for discharge devices of this kind may be produced according to the metal vapour process, which consists in that earth alkaline metal is applied to a suitable cathode core by vaporizing said metal on to said cathode surface. For this purpose a mixture of barium oxide with aluminium or silicon may be used which is heated in the vacuum until the reaction is performed and the metallic barium is vaporized. With the materials referred to there is encountered the following drawback: In addition to pure barium there is also formed barium aluminate, or barium silicate, which binds the major portion of the resulting barium and thus partly prevents the vaporization of the metallic barium.

An advantage in comparison to the reaction mixtures above referred to may be obtained with the use of magnesium as the reaction agent. However, in turn, this reaction mixture possesses the disadvantage that the magnesium itself is vaporized at a very low temperature. Since the magnesium always remains in part in the reaction mixture, not a pure barium vapour but a mixture of barium and magnesium vapour is obtained, so that it is not possible to produce in this way an emissive surface consisting of pure metallic barium.

According to the invention a reaction mixture is used comprising an earth alkaline oxide and a metallic reducing agent vaporizing at a temperature which is lower than that at which the earth alkaline metal is vaporized. The reaction is performed outside of the vacuum tube proper in a separate vacuum chamber, and the product which contains metallic barium is stored, under a suitable protective, for example paraffine, up to the time of use. In the vacuum tube itself the paraffine is evaporated, and by additional heating barium vapour is caused to be released.

According to one feature of the invention, magnesium is used as the reducing agent. The preliminary reaction performed outside of the actual vacuum tube is conducted to such extent that not only the formation of metallic barium is caused, but also, by increase of temperature, the evaporable magnesium residue is evaporated out of the reaction mass. This entire process is also performed under vacuum, and the reaction mixture produced is stored in a suitable protective. It may be advantageous to allow a small residue of non-evaporated magnesium to remain in the reaction mixture. This trace of magnesium is vaporized upon heating the mixture mounted in the valve wherein the cathode is to be produced, shortly before commencement of the vaporization of the barium, and binds any residual gas still present therein, so that the barium is atomized in a very perfect vacuum.

The process described in the above by way of example with regard to barium may be performed in exactly the same way with the use of the oxides of all other metals suitable for causing the high emission, for example calcium, strontium, beryllium, casium etc. Similarly, the above remarks in respect of magnesium also apply in the same manner to any other reducing agent having the property of vaporizing earlier than the highly emissive metal to be released, for example in the production of beryllium the use of metallic potassium.

I claim:

1. A method of manufacturing a material adapted for manufacturing highly emissive cathodes, said material containing an earth alkaline metal, comprising the steps of producing a mixture of the oxide of said metal with magesium powder in a suitable proportion, arranging said mixture in a vacuum and heating it to liberate said earth alkaline metal, heating said reaction mixture still further to eliminate the rest of the free metallic magnesium and coating the resulting reaction mixture, containing the free earth alkaline metal, and magnesium oxide, with a protective layer.

2. A method of manufacturing a material adapted for manufacturing highly emissive cathodes, said material containing an earth alkaline metal, comprising the steps of producing a mixture of the oxide of said metal with a metallic reducing agent vaporizing at a temperature which is lower than the vaporizing temperature of said earth alkaline metal, arranging said mixture in a vacuum and heating it to liberate said earth alkaline metal, heating said reaction mixture still further to eliminate the rest of the free metallic reducing agent and coating the resulting reaction mixture containing the free earth alkaline metal and magnesium oxide with a protective layer.

3. A method of producing highly emissive cathodes comprising the steps of producing a mixture of the oxide of an earth alkaline metal with magnesium powder, arranging said mixture in a vacuum and heating it for liberating said earth alkaline metal, heating said reaction mixture still further for eliminating the remaining free metallic magnesium, coating the resulting reaction mixture containing the free earth alkaline metal and magesium oxide with a protective layer, mounting said mixture with a cathode core, a grid and a plate in a bulb near said cathode core, heating said mixture for evaporating said protective layer, and heating said mixture further for evaporating said earth alkaline metal and for precipitating it on to said cathode core to form a highly emissive layer on said cathode core.

SIEGMUND LOEWE.